United States Patent [19]
Krenzer

[11] 3,900,485
[45] Aug. 19, 1975

[54] NEW SUBSTITUTED 1,2,4-THIADIAZOLIDINE-3,5-DIONES

[75] Inventor: John Krenzer, Oak Park, Ill.

[73] Assignee: Velsicol Chemical Corporation, Chicago, Ill.

[22] Filed: Feb. 10, 1967

[21] Appl. No.: 615,047

[52] U.S. Cl............... 260/302 D; 71/90; 260/544 C
[51] Int. Cl.²........................................ C07D 285/08
[58] Field of Search...................... 260/306.7, 302 D

[56] References Cited
UNITED STATES PATENTS

| | | | |
|---|---|---|---|
| 3,301,894 | 1/1967 | Ottmann et al. | 260/306.7 |
| 3,374,240 | 3/1968 | Ottmann et al. | 260/306.7 |
| 3,491,109 | 1/1970 | Zumach et al. | 260/306.7 |

*Primary Examiner*—Richard J. Gallagher
*Attorney, Agent, or Firm*—Robert J. Schwarz; Dietmar H. Olesch

[57] ABSTRACT

New herbicidal compounds having the formula

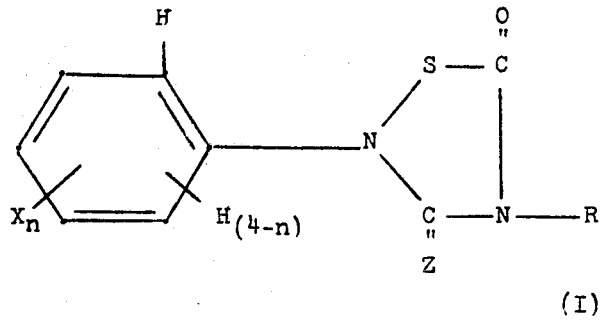

(I)

wherein R is selected from the group consisting of alkyl having 1 to 3 carbon atoms and alkenyl having 2 to 3 carbon atoms; Z is selected from the group consisting of oxygen and sulfur; X is selected from the group consisting of halogen, lower alkyl, lower alkenyl, lower haloalkyl, lower alkoxy, nitro, amino, lower alkylamino, lower dialkylamino, lower acylamino, N-lower alkyl-N-lower acylamino, lower alkylthio, lower alkylsulfoxide, lower alkyl sulfone, cyano, thiocyano and $$-N = CHR'$$

wherein R' is selected from the group consisting of hydrogen and lower alkyl and *n* is an integer from 0 to 4; herbicidal compositions comprising the compounds and an inert carrier; and a method of destroying undesirable plant life by applying to the plant life a herbicidal composition comprising a compound of the above structure and an inert carrier.

7 Claims, No Drawings

NEW SUBSTITUTED 1,2,4-THIADIAZOLIDINE-3,5-DIONES

This invention relates to new chemical compositions of the formula

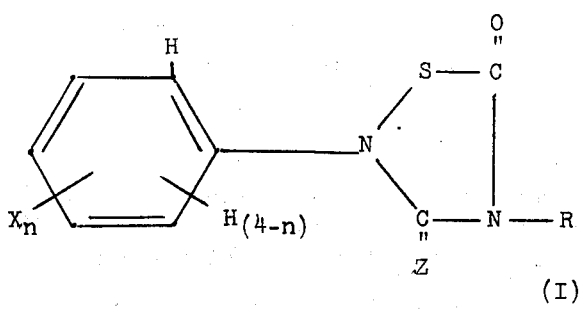

(I)

wherein R is selected from the group consisting of alkyl having 1 to 3 carbon atoms and alkenyl having 2 to 3 carbon atoms; Z is selected from the group consisting of oxygen and sulfur; X is selected from the group consisting of halogen, lower alkyl, lower alkenyl, lower haloalkyl, lower alkoxy, nitro, amino, lower alkylamino, lower dialkylamino, lower acylamino, N-lower alkyl-N-lower acylamino, lower alkylthio, lower alkylsulfoxide, lower alkyl sulfone, cyano, thiocyano and

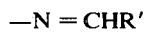
—N = CHR' wherein R' is selected from the group consisting of hydrogen and lower alkyl and n is an integer from 0 to 4. The term "lower" as used herein means up to about ten carbon atoms.

In one preferred embodiment of this invention, R, Z and X are as heretofore described and n is a minimum of 1, and preferably is greater than 1. In certain instances these compounds have utility not provided by the other compounds within this application.

In another preferred embodiment of this invention X is selected from the group consisting of halogen, lower alkyl, lower alkenyl, lower haloalkyl and nitro, and R, Z, and n are as heretofore described, provided that a maximum of two X's are nitro when n is greater than 2.

The compounds of the present invention are unexpectedly effective as pesticides and particularly as herbicides. Many of the compounds of the present invention are additionally effective as fungicides and as insecticides.

The new compounds of the present invention wherein X is selected from the group consisting of halogen, lower alkyl, lower alkenyl, lower haloalkyl, lower alkoxy, nitro, amino, lower acylamino, N-lower alkyl-N-lower acylamino, lower alkylthio, cyano and thiocyano, and R, Z and n are as heretofore described can be prepared readily from the corresponding compound of the formula

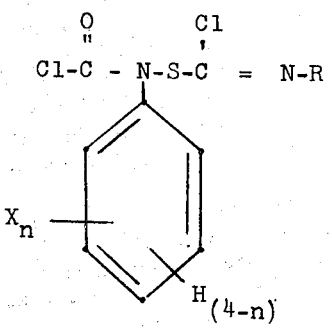

(II)

wherein X is described above and R, Z, and n are as described following structural formula I, by mixing or dissolving in warm water or alcohol water mixture to obtain the desired compound as a precipitate. The desired compound can be recovered from the reaction mixture by methods common to the art such as filtration, decantation, extraction, washing, drying, recrystallizing, and the like.

The compounds of the present invention wherein at least one X is a primary or secondary amine can be prepared readily by hydrolysis of the corresponding acylamino compound. Compounds having at least one X selected from the group consisting of lower alkylsulfoxides and lower alkylsulfones can be prepared from the corresponding lower alkylthio compound by oxidation by methods known to the art.

Compounds wherein at least one X is an imine of the formula

—N = CHR' can be prepared from the corresponding compound having an unsubstituted amino group in the position in which the imine group is desired by reacting with an appropriate aldehyde under dehydration conditions.

Compounds of Formula II can be prepared readily from the corresponding N-alkyl-S-chloroisothiocarbamoyl chloride by reacting with a suitably substituted phenylisocyanate in a solvent such as pentane. The reaction can be performed by mixing the two reactants in the solvent at a temperature of from about 10° to about 60° C., conveniently at room temperature. The desired compound of Formula II precipitates from the reaction mixture.

The N-alkyl-S-chloroisothiocarbamoyl chloride can be prepared by chlorinating an alkyl isothiocyanate wherein the alkyl group corresponds to R in Formula I. The chlorination is conveniently performed by mixing the alkyl isothiocyanate in a solvent such as dry pentane and chlorinating with an approximately equimolar amount of chlorine at a temperature of from about −10° C. to about −20° C. The chlorinating solution is stirred and allowed to warm to about 10° C. over a period of about one hour. The resulting reaction mixture can be used as such in the preparation of the compound of Formula II.

Suitable alkyl isothiocyanates for use in preparing the compound described above are exemplified by methyl isothiocyanate, ethyl isothiocyanate, allyl isothiocyanate, n-propyl isothiocyanate, isopropyl isothiocyanate, and the like.

Exemplary of suitable isocyanates which can be used in preparing the compounds described above are phenyl isocyanate, p-chlorophenyl isocyanate, m-chlorophenyl isocyanate, o-chlorophenyl isocyanate, 3,4-dichlorophenyl isocyanate, m-nitrophenyl isocyanate, o-tolyl isocyanate, 2-methyl-4-chlorophenyl isocyanate, p-methoxyphenyl isocyanate, p-tolyl isocyanate, p-cyanophenyl isocyanate and the like.

The manner in which the new compounds of the present invention can be prepared readily is illustrated in the following examples:

Example 1

Preparation of 2-Phenyl-4-Methyl-1,2,4-Thiadiazolidine-3,5-Dione

Methyl isothiocyanate (7.6 g.) was dissolved in dry pentane (250 ml.) and cooled to =10° C. Chlorine gas (vaporized from 7.1 g. of liquid chlorine) was added to the above solution over a period of 1 1/2 hours at −10 to −20° C. The reaction mixture was thereafter stirred for one hour at −10° C. and then placed under vacuum at −10° C. to remove excess chlorine. The solution, which contained N-methyl-S-chloroisothiocarbamoyl chloride, was filtered to remove a small quantity of solid material.

The solution obtained above was held at 0° to 10° C. and then added over a period of 15 minutes to a solution of phenyl isocyanate (10.5 g.) in pentane (50 ml.). N-Methyl S-[N'-(chlorocarbonyl)-phenylamino] isothiocarbamoyl chloride was formed rapidly as a white precipitate. The reaction mixture was stirred for one hour at 10°–15° C., filtered to recover the precipitate and washed with pentane.

The white solid product obtained above was added with stirring into water (500 ml.) and heated at 60° C. The mixture was stirred for 20 minutes and filtered, and the white solid residue washed with water. This residue, 2-phenyl-4-methyl-1,2,4-thiadiazolidine-3,5-dione, was recrystallized from methanol (400 ml.) to give a fine white needle structured solid. A portion of the compound was dried under vacuum at room temperature to give a sample melting at 110°–112° C. and having the following elemental analysis as calculated for $C_9H_8N_2O_2S$

|  | C | H | N | S |
|---|---|---|---|---|
| Theoretical % | 51.88 | 3.87 | 13.45 | 15.38 |
| Found % | 51.91 | 3.88 | 13.43 | 14.21 |

Example 2

Preparation of 2-(4'-Chlorophenyl)-4-Methyl-1,2,4-Thiadiazolidine-3,5-Dione

Methyl isothiocyanate (14.6 g; 0.2 mol) was dissolved in dry pentane (250 ml.) and cooled to −10° C. Chlorine gas (vaporized from 14 g. of liquid chlorine) was added to the above solution over a period of 1½ hours at −10° to −20° C. The reaction mixture was thereafter stirred for one hour at −10° C. and then placed under vacuum at −10° C. to remove excess chlorine. The solution which contained N-methyl-S-chloroisothiocarbamoyl chloride, was filtered to remove a small quantity of solid material.

The solution obtained above was held at 0° to 10° C. and then added over a period of 15 minutes to a solution of p-chlorophenyl isocyanate (23 g; 0.15 mol.) in pentane (50 ml.). N-Methyl S-[N'-(chlorocarbonyl)-4-chlorophenylamino] isothiocarbamoyl chloride was formed rapidly as a white precipitate. The reaction mixture was stirred for 1 hour at 10°–15° C., filtered to recover the precipitate and washed with pentane.

The white solid product obtained above was added with stirring into water (500 ml.) and heated at 60° C. The mixture was stirred for 20 minutes and filtered and the white solid residue washed with water. This residue, 2-(4'-chlorophenyl)-4-methyl 1,2,4-thiadiazolidine-3,5-dione, was recrystallized from methanol (800 ml.) to give a fine white crystalline solid. A portion of the compound was dried under vacuum at room temperature to give a sample melting at 113°–115° C. and having the following elemental analysis as calculated for $C_9H_7ClN_2O_2S$:

|  | C | H | N | S |
|---|---|---|---|---|
| Theoretical % | 44.52 | 2.91 | 11.54 | 13.21 |
| Found % | 44.67 | 3.10 | 11.53 | 13.15 |

Example 3

Preparation of 2-(3', 4'-Dichlorophenyl)-4-Methyl-1,2,4-Thiadiazolidine-3,5-Dione Methyl isothiocyanate (8.1 g.) was dissolved in dry pentane (250 ml.) and cooled to −10° C. Chlorine gas (vaporized from 8.0 g. of liquid chlorine) was added to the above solution over a period of 1½ hours at − ° to −20° C. The reaction mixture was thereafter stirred for 1 hour at −10° C. and then placed under vacuum at −10° C. to remove excess chlorine. The solution which contained N-methyl-S-chloroisothiocarbamoyl chloride, was filtered to remove a small quantity of solid material.

The solution obtained above was held at 0° to 10° C. and then added over a period of 15 minutes to a solution of 3,4-dichlorophenyl isocyanate (17 g.) in pentane (50 ml.). N-Methyl S-[N'-(chlorocarbonyl)-3,4-dichlorophenylamino] isothiocarbamoyl chloride was formed rapidly as a white precipitate. The reaction mixture was stirred for 1 hour at 10°–15° C., filtered to recover the precipitate and washed with pentane.

The white solid product obtained above was added with stirring into water (500 ml.) and heated to 60° C. The mixture was stirred for 20 minutes and filtered and the white solid residue washed with water. This residue, 2-(3',4'-dichlorophenyl)-4-methyl 1,2,4-thiadiazolidine-3,5-dione, was recrystallized from isopropanol (1 liter) to give a fine white crystalline solid. A portion of the compound was dried under vacuum at room temperature to give a sample melting at 155°–156° C. and having the following elemental analysis as calculated for $C_9H_6Cl_2N_2O_2S$:

|  | C | H | N | S |
|---|---|---|---|---|
| Theoretical % | 39.17 | 2.18 | 10.12 | 11.58 |
| Found % | 39.25 | 2.47 | 10.18 | 11.44 |

Example 4

Preparation of 2-(3'-Nitrophenyl)-4-Methyl-1,2,4-Thiadiazolidine-3,5-Dione

Methyl isothiocyanate (5.8 g.) was dissolved in dry pentane (200 ml.) and cooled to −10° C. Chlorine gas (vaporized from 5.7 g. of liquid chlorine) was added to the above solution over a period of 1½ hours at −10° to −20° C. The reaction mixture was thereafter stirred for 1 at −10° C. and then placed under vacuum at −10° C. to remove excess chlorine. The solution which contained N-methyl-S-chloroisothiocarbamoyl chloride was filtered to remove a small quantity of solid material.

The solution obtained above was held at 0° to 10° C. and then added over a period of 15 minutes to a solution of m-nitrophenyl isocyanate (10 g.) in pentane (50 ml.). N-Methyl S-[N'-(chlorocarbonyl)-3-nitrophenylamino] isothiocarbamoyl chloride was formed rapidly as a white precipitate. The reaction mixture was stirred for one hour at 10°–15° C., filtered to recover the precipitate and washed with pentane.

The white solid product obtained above was added with stirring into water (500 ml.) and heated at 60° C. The mixture was stirred for 20 minutes and filtered and the yellow solid residue washed with water. This residue, 2-(3'-nitrophenyl)-4-methyl 1,2,4-thiadiazolidine-3,5-dione, was recrystallized from methanol to give a fine white needle structured solid. A portion of the compound was dried under vacuum at room temperature to give a sample melting at 119°–121° C. and having the following elemental analysis as calculated for $C_9H_7N_3O_4S$:

|  | C | H | S |
|---|---|---|---|
| Theoretical % | 42.72 | 2.79 | 12.65 |
| Found % | 43.06 | 2.96 | 12.53 |

Other compounds within the scope of the present invention can be prepared readily by the procedures heretofore described. Presented in the following examples are the essential ingredients required to prepare the indicated named compounds according to the procedure detailed in the foregoing examples.

Example 5

Methyl isothiocyanate + p-bromophenyl isocyanate = 2-(4'-bromophenyl)-4-methyl-1,2,4-thiadiazolidine-3,5-dione, melting point 149°–151° C.

Example 6

Ethyl isothiocyanate + phenyl isocyanate = 2-phenyl-4-ethyl-1,2,4-thiadiazolidine-3,5-dione, melting point 70°–71° C.

Example 7

Ethyl isothiocyanate + 3,4-dichlorophenyl isocyanate = 2-(3',4'-dichlorophenyl)-4-ethyl-1,2,4-thiadiazolidine-3,5-dione, melting point 114°–116° C.

Example 8

Methyl isothiocyanate + o-chlorophenyl isocyanate = 2-(2'-chlorophenyl)-4-methyl-1,2,4-thiadiazolidine-3,5-dione, melting point 91°–93° C.

Example 9

Methyl isothiocyanate + m-chlorophenyl isocyanate = 2-(3'-chlorophenyl)-4-methyl-1,2,4-thiadiazolidine-3,5-dione, melting point 109°–111° C.

Example 10

Methyl isothiocyanate + m-trifluoromethylphenyl isocyanate = 2-(3'-trifluoromethylphenyl)-4-methyl-1,2,4-thiadiazolidine-3,5-dione.

Example 11

Methyl isothiocyanate + p-methoxyphenyl isocyanate = 2-(4'-methoxyphenyl)-4-methyl-1,2,4-thiadiazolidine-3,5-dione.

Example 12

Methyl isothiocyanate + p-methylthiophenyl isocyanate = 2-(4'-methylthiophenyl)-4-methyl-1,2,4-thiadiazolidine-3,5-dione.

Example 13

Methyl isothiocyanate + m-(dimethylamino)phenyl isocyanate = 2-[3'-(dimethylamino)phenyl]-4-methyl-1,2,4-thiadiazolidine-3,5-dione.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in-oil) can be prepared for direct application to weed infestations.

A typical herbicidal composition according to this invention is illustrated by the following example, in which the quantities are in parts by weight.

Example 14

Preparation of a Dust

| Product of Example 3 | 10 |
|---|---|
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers; spreaders; deactivators; adhesives; stickers; fertilizers; activators; synergists, and the like.

The compounds of the present invention are also useful when combined with other herbicides and/or defoliants, dessicants, growth inhibitors, and the like, in the herbicidal compositions heretofore described. These other materials can comprise from about 5 percent to about 95 percent of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), and the like; carbamate herbicides such as IPC, CIPC, swep, barban, and the like; thiocarbamate and dithiocarbamate herbicides such as CDEC, metham sodium, EPTC, diallate, PEBC, and the like; substituted urea herbicides such as dichloral urea, fenuron, monuron, diuron, linuron, monolinuron, neburon, and the like; symmetrical triazine herbicides such as simazine, chlorazine, atrazine, trietazine, simetone, prometone, propazine, ametryne, and the like; chloroacetamide herbicides such as α-chloro-N,N-dimethylacetamide, 2-chloro-N,N-diallylacetamide, CDEA, α-chloro-N-isopropyl acetamide, 4-(chloroacetyl)morpholine, 1-(chloroacetyl)piperidine, and the like; chlorinated aliphatic acid herbicides such as TCA, dalapon, 2,3-dichloropropionic acid, and the like, chlorinated benzoic acid and the phenylacetic acid herbicides such as 2,3,6-TBA, 2,3,5,6-TBA, dicamba, tricamba, amiben, fenac, 2-methoxy-3,6-dichlorophenylacetic acid, 3-methoxy-2,6-dichlorophenylacetic acid, 2-methoxy-3,5,6-trichlorophenylacetic acid, and the like; and such compounds as O,S-dimethyl tetrachlorothioterephthalate, methyl 2,3,5,6-tetrachloro-N-methoxy-N-methylterephthalamate, 2-[(4-chloro-o-tolyl)oxy]-N-methoxyacetamide, aminotriazole, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluralin, solan, dicryl, merphos, DMPA and the like. Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. Thus, the new compounds are particularly effective in the pre-emergence and post-emergence control, especially the post-emergence control, of such weeds as barnyard grass, crabgrass, curly dock, foxtail, mustard, pigweed, purslane and wild oats.

The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the applications of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of curly dock. In these experiments small plastic greenhouse pots filled with dry soil were seeded with curly dock. Twenty-four hours or less after seeding the pots were sprayed with water until the soil was wet and the test compounds formulated as aqueous emulsions of acetone solutions containing emulsifiers were sprayed at the indicated concentrations on the surface of the soil. After spraying, the soil containers were placed in the greenhouse and provided with supplementary heat as required and daily or more frequent watering. The plants were maintained under these conditions for a period of from 15 to 21 days at which time the condition of the plants and the degree of injury to the plants were rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these compounds is demonstrated by the following data:

| Compound of | Dosage Concn. Actual Chemical Compound per acre | Injury Rating |
|---|---|---|
| Example 1 | 2 | 7 |
| " | 8 | 8 |
| Example 2 | 2 | 7 |
| " | 8 | 8 |
| Example 3 | 2 | 6 |
| " | 8 | 9 |

The above experiments were repeated except that the pots were seeded with purslane rather than curly dock. The effectiveness of these compounds is demonstrated by the following data:

| Compound of | Dosage Concn. Actual Chemical Compound per acre | Injury Rating |
|---|---|---|
| Example 1 | 2 | 8 |
| " | 8 | 9 |
| Example 2 | 2 | 8 |
| " | 8 | 9 |
| Example 3 | 2 | 8 |
| " | 8 | 9.5 |

The herbicidal activity of the compounds of this invention was also demonstrated by experiments carried out for the post emergence control of rough pigweed. In these experiements the compounds to be tested were formulated as aqueous emulsions and sprayed at the indicated dosage on the foliage of pigweed plants that had attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data:

| Compound of | Dosage Concn. Actual Chemical Compound per acre | Injury Rating |
|---|---|---|
| Example 1 | 2 | 7 |
| " | 8 | 9 |
| Example 2 | 2 | 9 |
| " | 8 | 10 |
| Example 9 | 2 | 10 |
| " | 8 | 10 |

The above experiments were repeated except that mustard plants were used in place of pigweed plants. The effectiveness of these compounds is demonstrated by the following data:

| Compound of | Dosage Concn. Actual Chemical Compound per acre | Injury Rating |
|---|---|---|
| Example 1 | 2 | 10 |
| " | 8 | 10 |
| Example 2 | 2 | 10 |
| " | 8 | 10 |
| Example 3 | 2 | 10 |
| " | 8 | 10 |

The above experiment was repeated except that purslane plants were used in place of mustard plants. The effectiveness of these compounds is demonstrated by the following data:

| Compound of | Dosage Concn. Actual Chemical Compound per acre | Injury Rating |
|---|---|---|
| Example 1 | 2 | 8 |
| " | 8 | 10 |
| Example 2 | 2 | 10 |
| " | 8 | 10 |
| Example 3 | 2 | 10 |
| " | 8 | 10 |

The above experiment was repeated except that velvet leaf plants were used in place of purslane plants. The effectiveness of these compounds is demonstrated by the following data:

| Compound of | Dosage Concn. Actual Chemical Compound per acre | Injury Rating |
|---|---|---|
| Example 1 | 2 | 5 |
| " | 8 | 7 |
| Example 2 | 2 | 7 |
| " | 8 | 8 |
| Example 3 | 2 | 8 |
| " | 8 | 9 |

I claim:

1. 2-phenyl-4-methyl-1,2,4-thiadiazolidine-3,5-dione.
2. 2-(4'-chlorophenyl)-4-methyl-1,2,4-thiadiazolidine-3,5-dione.
3. 2-(3',4'-dichlorophenyl)-4-methyl-1,2,4-thiadiazolidine-3,5-dione.
4. 2-(3'-nitrophenyl)-4-methyl-1,2,4-thiadiazolidine-3,5-dione.
5. 2-(4'-fluorophenyl)-4-methyl-1,2,4-thiadiazolidine-3,5-dione.
6. 2-(4'-bromophenyl)-4-methyl-1,2,4-thiadiazolidine-3,5-dione.
7. 2-(2',4'-dichlorophenyl)-4-methyl-1,2,4-thiadiazolidine-3,5-dione.

\* \* \* \* \*

UNITED STATES PATENT OFFICE
CERTIFICATE OF CORRECTION

PATENT NO. : 3,900,485
DATED : August 19, 1975
INVENTOR(S) : John Krenzer

It is certified that error appears in the above—identified patent and that said Letters Patent are hereby corrected as shown below:

In column 3, line 2, for "=10°C." read -- -10°C. --.

In column 3, line 34, for "14.21" read -- 15.21 --.

In column 4, line 17, after "at -" insert -- 10 --.

In column 4, line 33, for "to" read -- at --.

In column 4, line 58, after "for 1" insert -- hour --.

Signed and Sealed this twenty-third Day of December 1975

[SEAL]

Attest:

RUTH C. MASON
Attesting Officer

C. MARSHALL DANN
Commissioner of Patents and Trademarks